United States Patent
Gay (10) Patent No.: US 6,224,798 B1
(45) Date of Patent: May 1, 2001

(54) METHOD FOR FABRICATING POWDERED METAL CORES

(75) Inventor: David Earl Gay, Pendleton, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/629,923

(22) Filed: Jul. 31, 2000

(51) Int. Cl.⁷ ............... B29B 9/12; B29B 9/16; B29C 35/02
(52) U.S. Cl. ........... 264/102; 264/122; 264/126; 264/331.12; 264/331.19; 264/109; 264/101; 427/213; 427/214; 427/216; 427/221; 427/410
(58) Field of Search ........................... 264/101, 109, 264/121, 122, 125, 126, 330, 331.11, 331.12, 331.19, 102; 427/212, 213, 214, 215, 216, 220, 221, 402, 407.1, 409, 410, 421

(56) References Cited

U.S. PATENT DOCUMENTS

| | | | |
|---|---|---|---|
| 5,240,742 | * 8/1993 | Johnson et al. | 427/216 |
| 5,272,008 | 12/1993 | Shain et al. | 428/407 |
| 5,591,373 | 1/1997 | Ward et al. | 252/62.54 |
| 5,730,922 | * 3/1998 | Babb et al. | 264/258 |
| 6,046,276 | * 4/2000 | Ambrose et al. | 525/101 |
| 6,077,608 | * 6/2000 | Barkac et al. | 428/411.1 |

* cited by examiner

*Primary Examiner*—Mary Lynn Theisen
(74) *Attorney, Agent, or Firm*—Margaret A. Dobrowitsky (57) ABSTRACT

A method of curing a polymeric binder onto a powdered metal after such polymer has been coated on the powdered metal but before a part is therefrom molded, thereby forming a polymer matrix-powdered metal composite material. The polymer-coated powdered metal may be cured by retaining the polymer-coated powdered metal in a fluidized bed contained within a fluidized bath (e.g. a fluid bed coater/drier apparatus) even after the coating process has terminated. The temperature of the fluidized bath may then be raised, in turn raising the temperature of the fluidized bed, thereby curing the polymer onto the coated powdered metal in situ. By keeping the polymer-coated power metal in constant motion during the curing process, the polymer-coated powdered metal particles do not agglomerate nor otherwise adhere to other coated powdered metal particles.

17 Claims, 10 Drawing Sheets

METHOD FOR FABRICATING POWDERED METAL CORES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to electromagnetic coils and more particularly to the fabrication of silicone-potted ignition coils and high temperature ignition coils.

2. Description of the Background Art

Conventionally, composite iron powders are coated with various polymeric binders, which insulate a plurality of iron powder particles from one another after the iron powder particles are pressed to form a part. An insulated core formed from iron powder particles may be utilized for AC electromagnetic applications because the magnetic characteristics are similar to a laminated sheet stack core. The binders may be thermoplastic polymeric materials, thermoset polymeric materials, inorganic materials, or a combination of all types of these materials. If a thermoset resin is used, the molded part can be cured (i.e., cross-linked) in an attempt to impart better molding properties. However, upon curing, undesirable results such as the formation of a hard insoluble film on the part's surface may occur. This unwanted film can cause inhibition problems with the potting materials, dimensional control problems, and performance difficulties. The film formation results in added expense for its removal, imposes additional processing time, and may degrade the dimensional control causing the need for machining the part.

Although various organic and inorganic materials have been used to coat the surface of a powdered metal, more frequently organic binders such as thermoplastics and thermosets are used. Thermoset resins are reactive materials, which cross-link or react upon exposure to various sources of energy such as heat, ultraviolet radiation, and pressure. When a powdered metal is coated with a thermoset binder, the binder is typically left unreacted (i.e. uncured) until the part is molded. Upon subsequent cross-linking, reaction by-products can be detrimental to the core or to the remainder of the system. These reaction by-products can include evolved gases, moisture, or a physical interaction with other organic materials (e.g. lubricants). If the thermoset coating on powdered metal (PM) is cross-linked when making static physical contact (i.e. at a stage prior to molding while still a free flowing powder), the powdered metal agglomerates or worse forms a large solid mass, taking the shape of its container.

BRIEF SUMMARY OF THE INVENTION

By way of example, and not of limitation, the present invention comprises a method of coating a powdered metal with a cross linking polymer and then curing the cross linking polymer after such polymer has been coated on the metal powder but before a part is molded, thereby forming a cured polymer matrix-powdered metal composite material. The pre-cured polymer coated powdered metal is preferably cured by retaining the pre-cured polymer coated metal in a fluidized bed contained within a fluidized bath (e.g. a fluid bed coater/drier apparatus) after the coating process has terminated. The polymer solution coated powdered metal is then dried in situ to remove the solvent. The temperature of the fluidized bed may then be raised by increasing the overall temperature of the fluidized bath, thereby curing the polymer onto the powdered metal in situ.

By keeping the polymer coated powdered metal in constant motion during the coating, the drying, and the curing process, the polymer coated powdered metal does not agglomerate or otherwise adhere to other polymer coated particles of powdered metal. Therefore, the need for post-curing, the inhibition problem, the lack of dimensional control, the lengthy tumbling process, the inability to use newer silicone impregnation materials, and other related problems are eliminated.

Additionally, the pre-cured polymer coated powdered metal maintains a surprisingly high green strength in the range of 2500 to 4000 psi as well as a high green density in the range of 7.10 to 7.30 g/cc for a typical 0.50% w/o phenolic polymer coated on a typical 100 micron particle size pure iron powder. Thus, a net-shaped part, which may be molded from such pre-cured polymer coated powdered metal, performs quite well.

By curing the thermoset polymer on the individual particles of powdered metal as a continuation of the coating process, rather than by curing the molded part in its entirety, the problems associated with curing by-products (such as silicone inhibition interaction or surface contamination) are circumvented. The cured polymer coated metal powder may then be molded (with optional warm pressing by uniaxial, isostatic, or dynamic magnetic compaction) into a net-shaped part, forming a polymer matrix-powdered metal composite material. The net-shape may comprise a core-shape for forming an electromagnetic coil core. This core may be configured in several shapes (e.g. cylinder, toroid, "E," "EF," "EM," "U," bus bar, bobbin, hollow, disk, or any combination thereof).

The cured polymer coated powdered metal may also be over-coated with one or more additional polymer or lubricant layers as needed. By layering with an additional coating, the powdered metal substrate can increase the strength, density, and moldability of a part, which may be further protected from detrimental diffusion of oxygen, moisture, and corrosive gases and vapors.

Multiple layers of polymer coating also provides a barrier form of protection for each particle against elemental magnetic degradation, which may occur, thereby lowering the irreversible losses. This is true especially in the case of neodymium-iron-boron (Nd—Fe—B) permanent magnetic materials when used as the substrate powdered metal, particularly when exposed to elevated temperatures. The use of multiple binders may also affect the electromagnetic properties of the molded part.

Traditional polymer coatings allow many gases to diffuse through the polymer layer. Such diffusion can allow a detrimental reaction between the diffused gasses and the metal substrate. A cured epoxy coating is particularly effective as a barrier to limit or prevent the diffusion of these gases. Another benefit conferred by the present invention is that the imidization of a polyimide resin binder provides very high temperature and corrosion resistance.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings, which are for illustrative purposes only.

DETAILED DESCRIPTION OF THE INVENTION

Referring more specifically to the drawings, where like reference numbers denote like steps or parts, for illustrative purposes the present invention is generally shown. It will be appreciated that the apparatus may vary as to configuration and as to details of the parts, and that the method may vary as to the specific steps and sequence, without departing from the basic concepts as disclosed herein.

Figure 1:
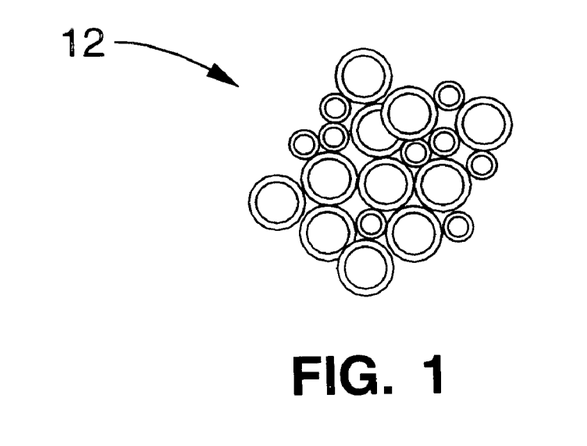
FIG. 1 is a diagram indicating the problem arising when individual particles of powdered metal aggregate into a plurality of agglomerated particles of powdered metal (PM).

Referring first to FIG. 1, those skilled in the art will appreciate the problem that arises when individual powdered metal particles aggregate into a plurality of agglomerated particles of powdered metal (PM) 12. Such agglomerations may form a solid mass and take on the shape of the container holding the powdered metal. Agglomerations such as these make the material unsuitable for molding into composite cores.

Figure 2:
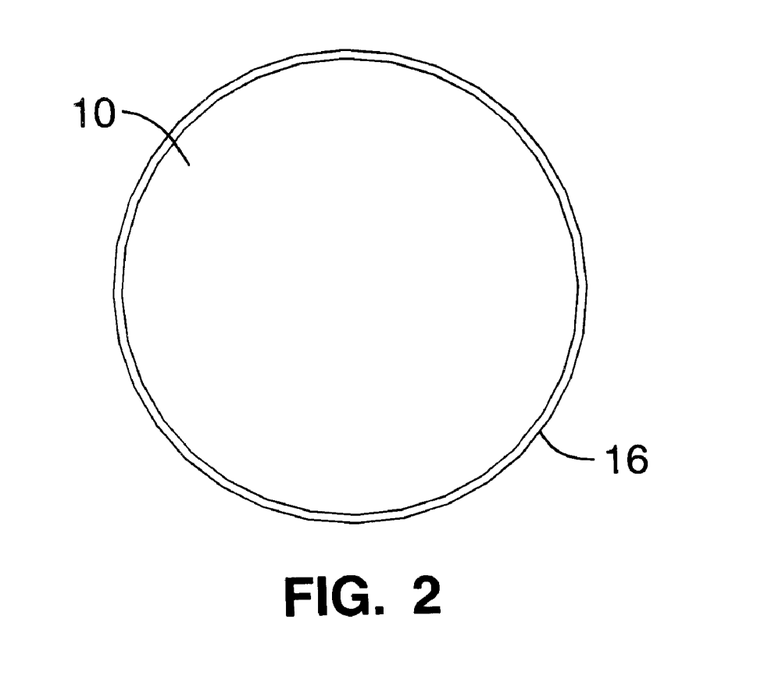
FIG. 2 is a schematic cross-sectional view of a powdered metal particle coated with a single layer of polymer.

The metal substrate 10 is shown in FIG. 2 encased within a thin layer of polymer 16. Multiple layers of the same polymer or multiple layers of different polymers (not shown) also provide a barrier for the particle of powdered metal to moisture, oxygen and corrosive gaseous reaction products.

The present invention, which solves the problem of agglomerations and films, will now be described with reference to the flowchart of FIG. 3. As shown therein, the method comprises the steps of preferably introducing a plurality of powdered metal particles into a fluidized bath having a fluidized bed, wherein the fluidized bed contains the uncoated metal substrate 100. While a fluid bed is preferred, it will be understood that other agitating, mixing or coating devices known in the art are suitable.

The plurality of powdered metal particles (PM) is then set in constant motion by the fluidized bed as indicated by step 102.

Then a cross linking polymer in a solution is introduced or sprayed on the powdered metal substrate within the fluidized bed as indicated by at step 104. The powdered metal particles are thereby coated with a layer of cross-linking polymer as shown schematically in FIG. 2.

The solvent is then evaporated or dried from the plurality of coated powdered metal particles in situ as indicated by step 106.

Next, the temperature of the fluidized bath is preferably elevated to a temperature that will simultaneously heat the fluidized bed and cure the cross linking polymer onto the plurality of powdered metal particles in situ and thereby form a plurality of cured polymer coated powdered metal particles as indicated by step 108.

If desired, for further customized protection of the plurality of the powdered metal particles, a second or third polymer coating 112 may be added to the particles by sequentially repeating steps of coating, drying and curing, steps 104 through 108, with these subsequent polymers as indicated by step 110. The subsequent layers of cross-linking polymers may be composed of the same polymers or different polymers. As seen in step 110, any number of subsequent coatings may be applied by the coating, drying and curing steps.

After the coating and curing processes are complete, the plurality of cured polymer coated powdered metal particles are removed from the fluid bed as indicated by step 114. Lubricants or other additives can then be mechanically blended to the coated and cured powdered metal particles if necessary as shown in step 118. Such lubricants or other additives are useful in the molding process. However, as seen in decision step 116, if no lubricants or additives are needed then the powdered metal particles are molded according to step 120.

Finally, the plurality of powdered metal particles coated with at least one layer of at least one polymer, forming the polymer matrix-powdered metal composite material (PMPMC), are molded into desired shapes as indicated by step 120. The polymer matrix-powdered metal composite is preferably molded into a core for an ignition coil as indicated step 122.

Figure 4:
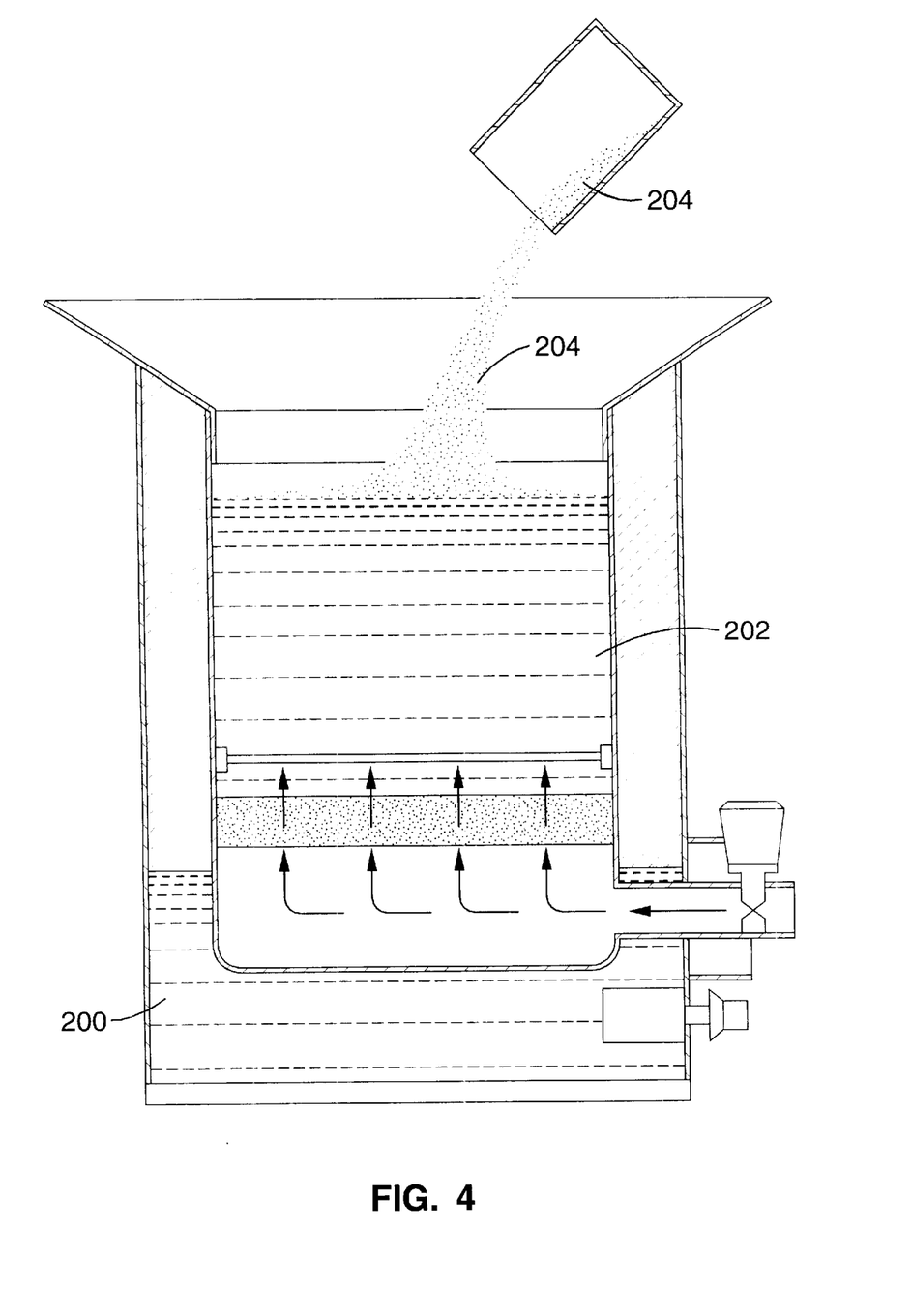
FIG. 4 is a schematic diagram depicting a plurality of powdered metal particles being introduced within the fluidized bed in accordance with the present invention.

FIG. 4 through FIG. 10 sequentially illustrates each process step for coating, drying, curing, and forming the core for use in an ignition coil. FIG. 4 illustrates process step 100, wherein a plurality of bare powdered metal particles 204 are introduced into fluidized bed 202 as a substrate.

Figure 5:
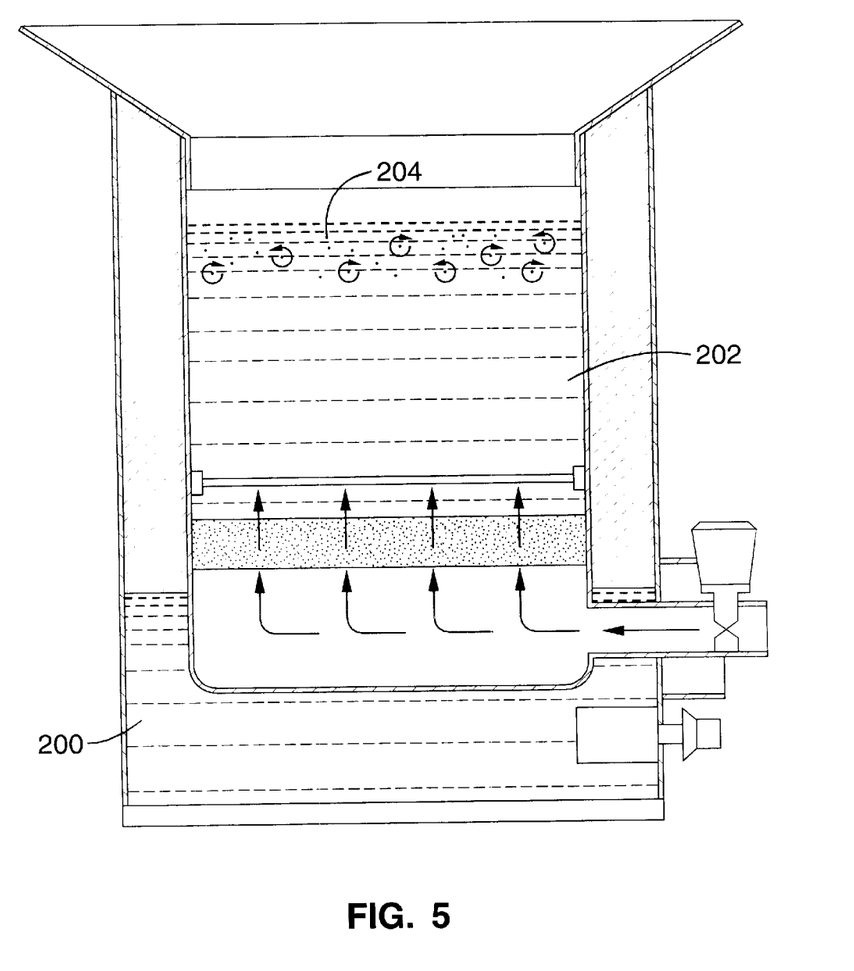
FIG. 5 is a schematic diagram depicting the plurality of powdered metal particles being set in constant motion by the fluidized bed in accordance with the present invention.

Turning now to FIG. 5, process step 102 is illustrated, wherein the plurality of powdered metal particles 204 is set in constant motion by fluidized bed 202 as indicated by the curved arrows. The motion is preferably maintained throughout the process steps set forth in steps 101 through 108 of FIG. 3.

Figure 6:
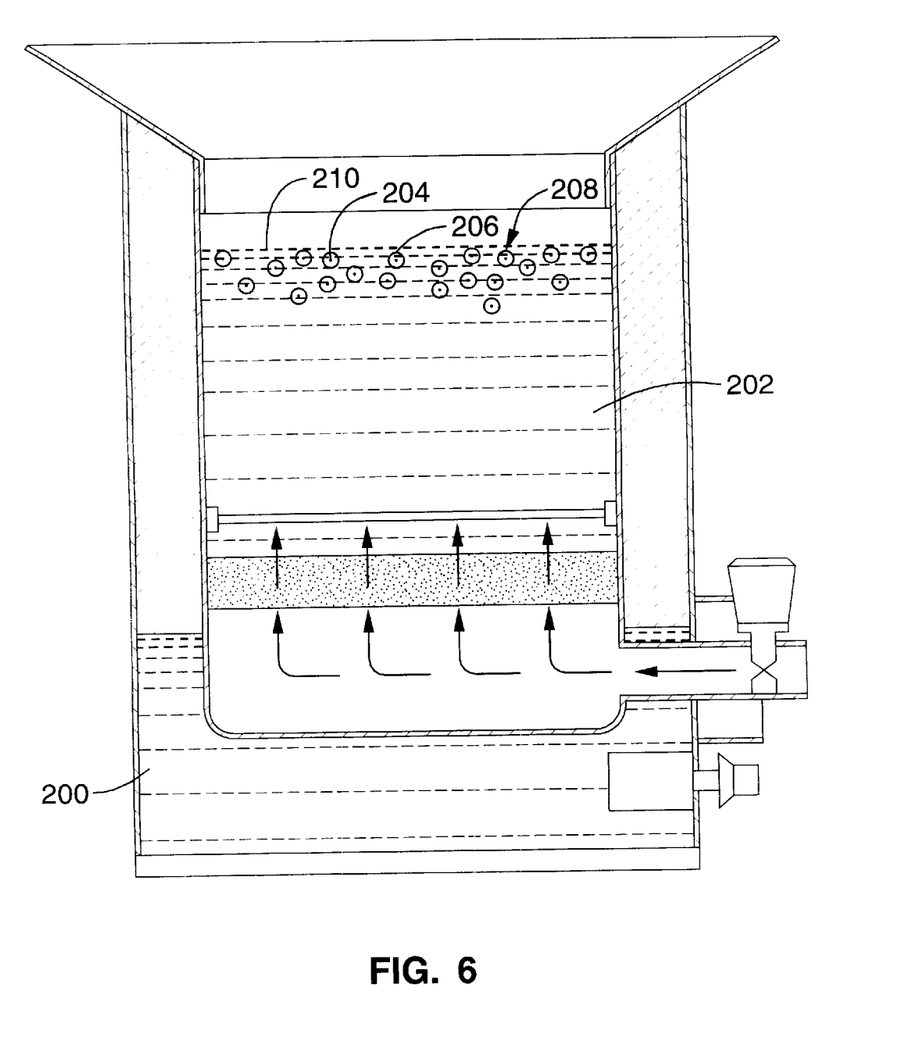
FIG. 6 is a schematic diagram depicting the plurality of powdered metal particles being coated with a layer of the soluble polymer in accordance with the present invention.

FIG. 6 illustrates process step 104, wherein the plurality of powdered metal particles 204 are coated with a layer 206 of the cross linking polymer, forming a plurality of coated powdered metal particles 208.

Figure 3:
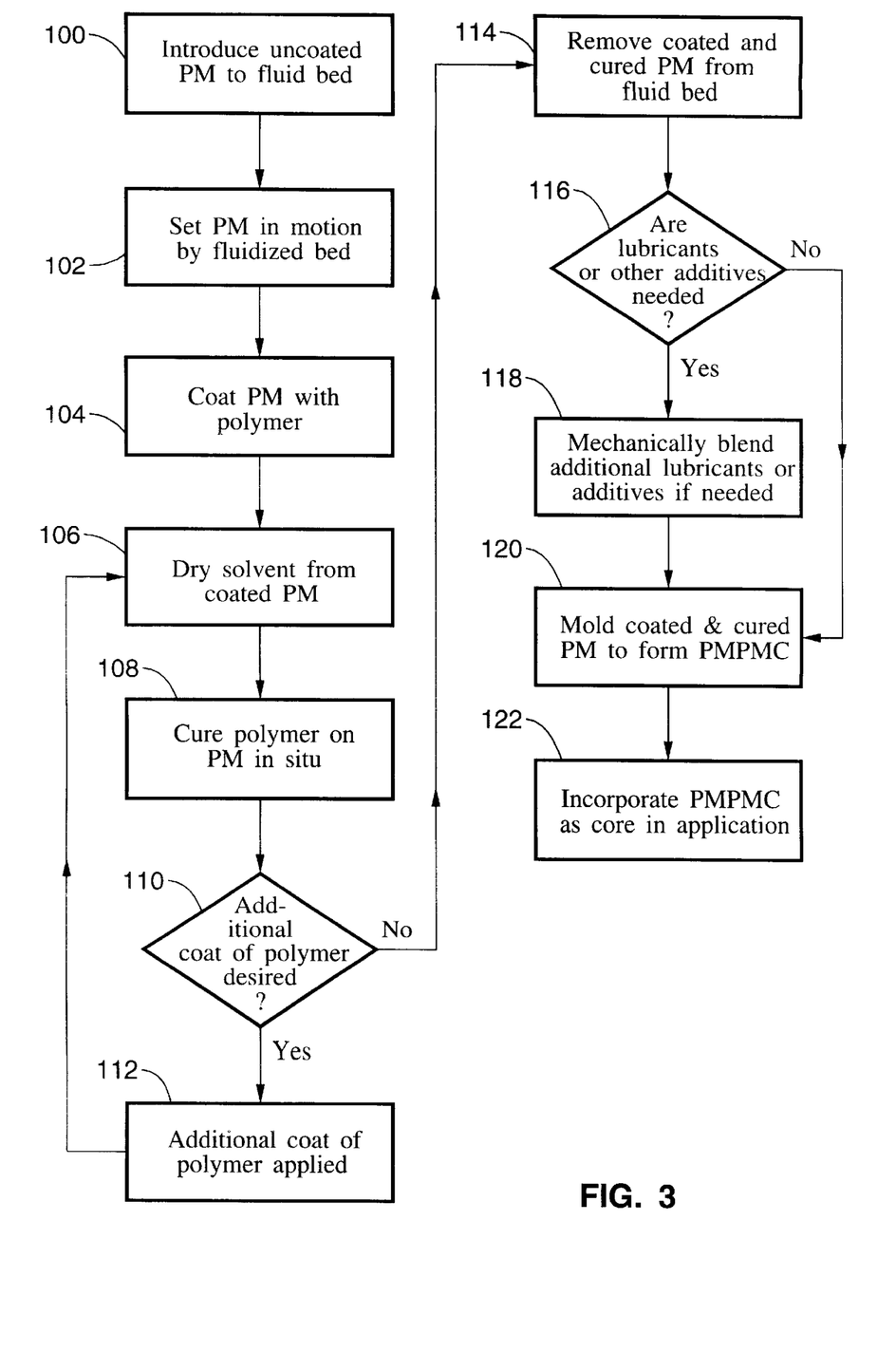
FIG. 3 is a flowchart showing the generalized process steps for fabricating a polymer matrix-powdered metal composite (PMPMC) core preferably for use in an ignition coil in accordance with the present invention.
Figure 7:
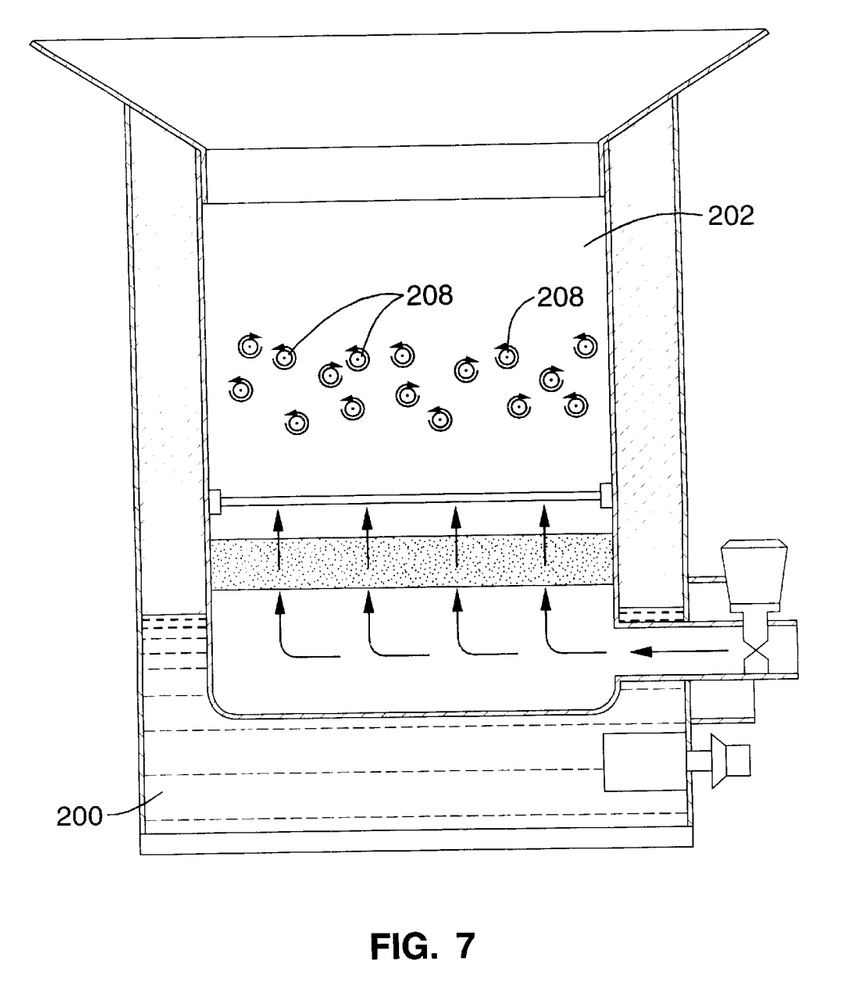
FIG. 7 is a schematic diagram depicting the plurality of coated powdered metal particles being dried in accordance with the present invention.

Process step 106, diagrammatically shown in FIG. 3, is shown in FIG. 7 wherein the coated powdered metal particles 208 are dried. Once dried, subsequent coatings of polymer may be applied through the coating and drying process shown in FIG. 5 through FIG. 7 and described in process step 108.

Figure 8:
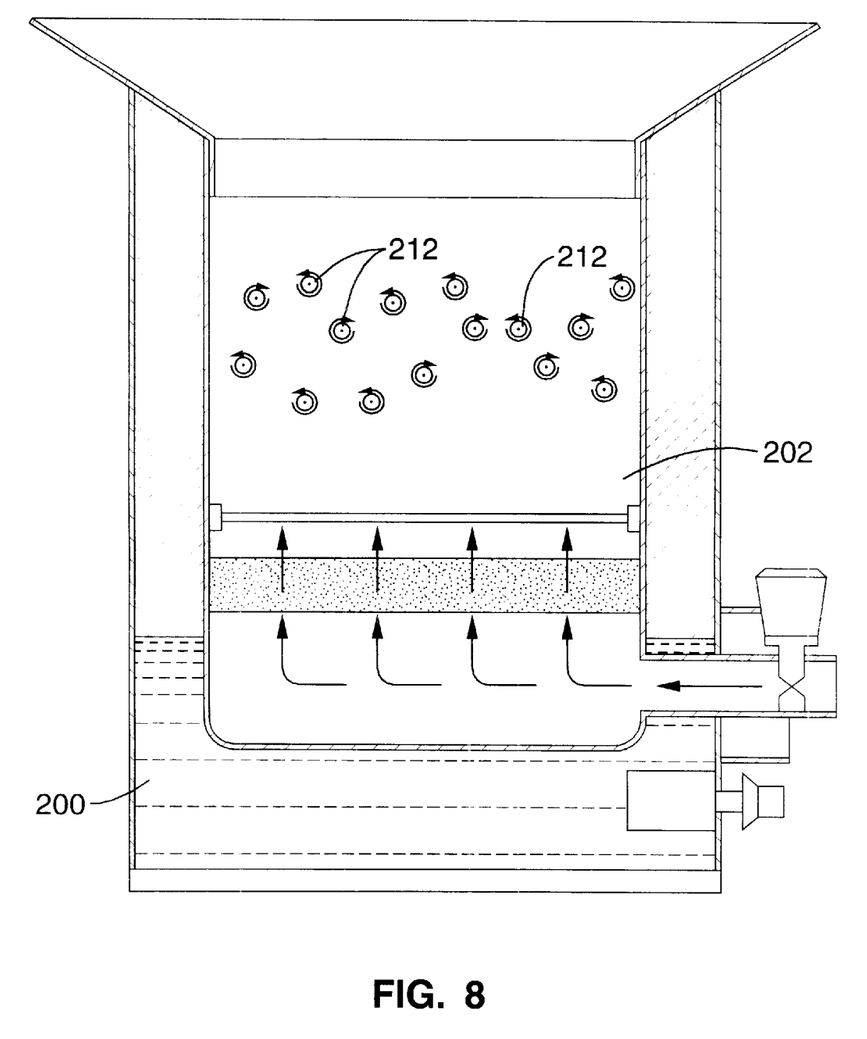
FIG. 8 is a schematic diagram depicting the cross linked polymer being cured onto the plurality of powdered metal particles in situ by heating the fluidized bath, thereby heating the fluidized bed, and thereby forming a plurality of cured polymer coated powdered metal particles in accordance with the present invention.

FIG. 8 illustrates process step 108, wherein the deposited and dried layer 212 of the cross-linking polymer is cured onto the plurality of powdered metal particles in situ by heating the fluidized bath 200 which, in turn, heats the fluidized bed 202, and thereby forms a plurality of cured polymer coated powdered metal particles 212. As seen in FIG. 3, the process steps of applying an additional coating of polymer 112, drying 106 and curing 108 may be repeated to produce powdered metal particles with multiple coats of one or more polymers.

Figure 9:
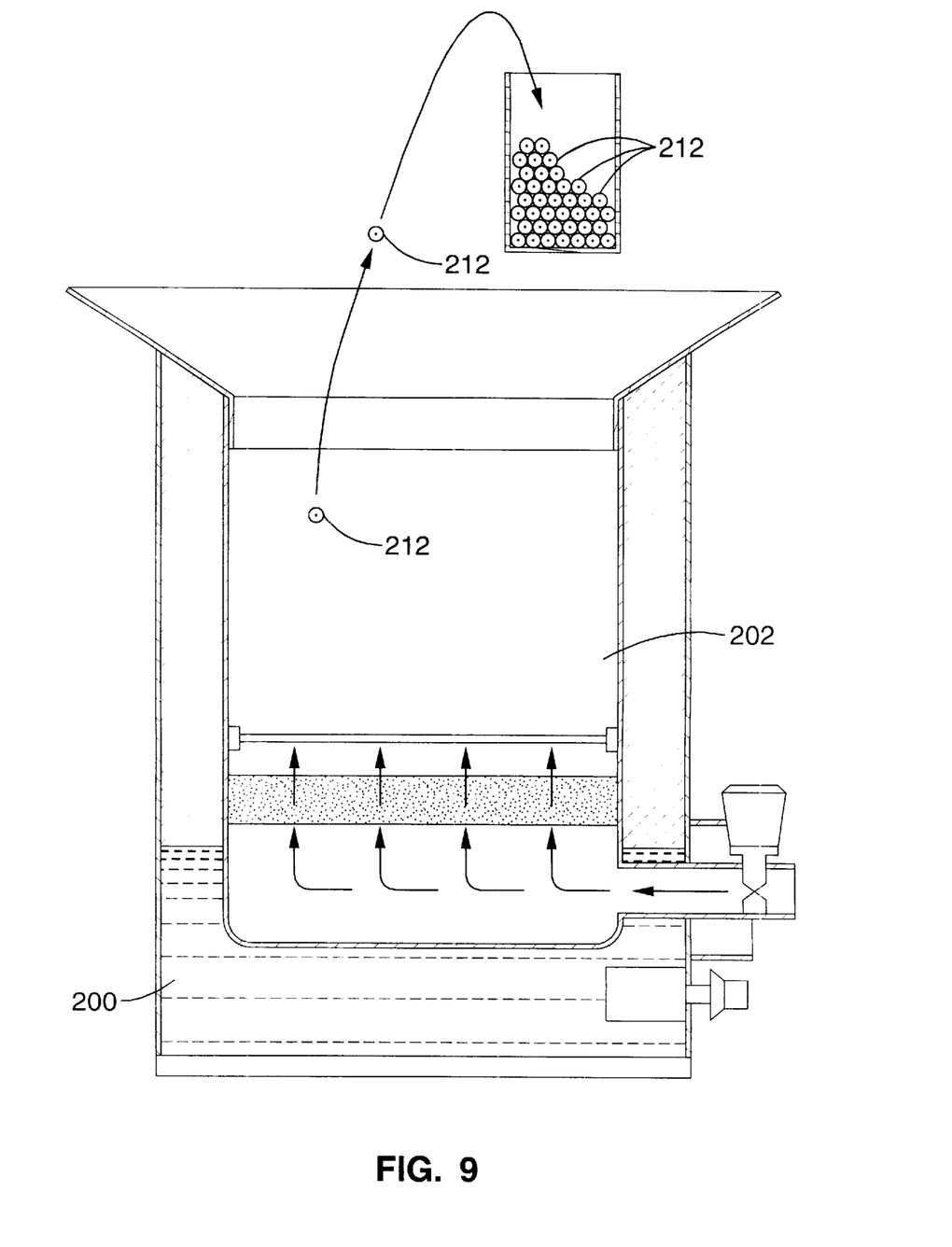
FIG. 9 is a schematic diagram depicting the plurality of cured polymer coated powdered metal particles being removed from the fluidized bed, in accordance with the present invention.

FIG. 9 illustrates process step 114, wherein the plurality of pre-cured polymer coated powdered metal particles 212 are removed from the fluidized bed 202. Upon removal, lubricants or other additives may be added to assist in the molding process 118.

Figure 10:
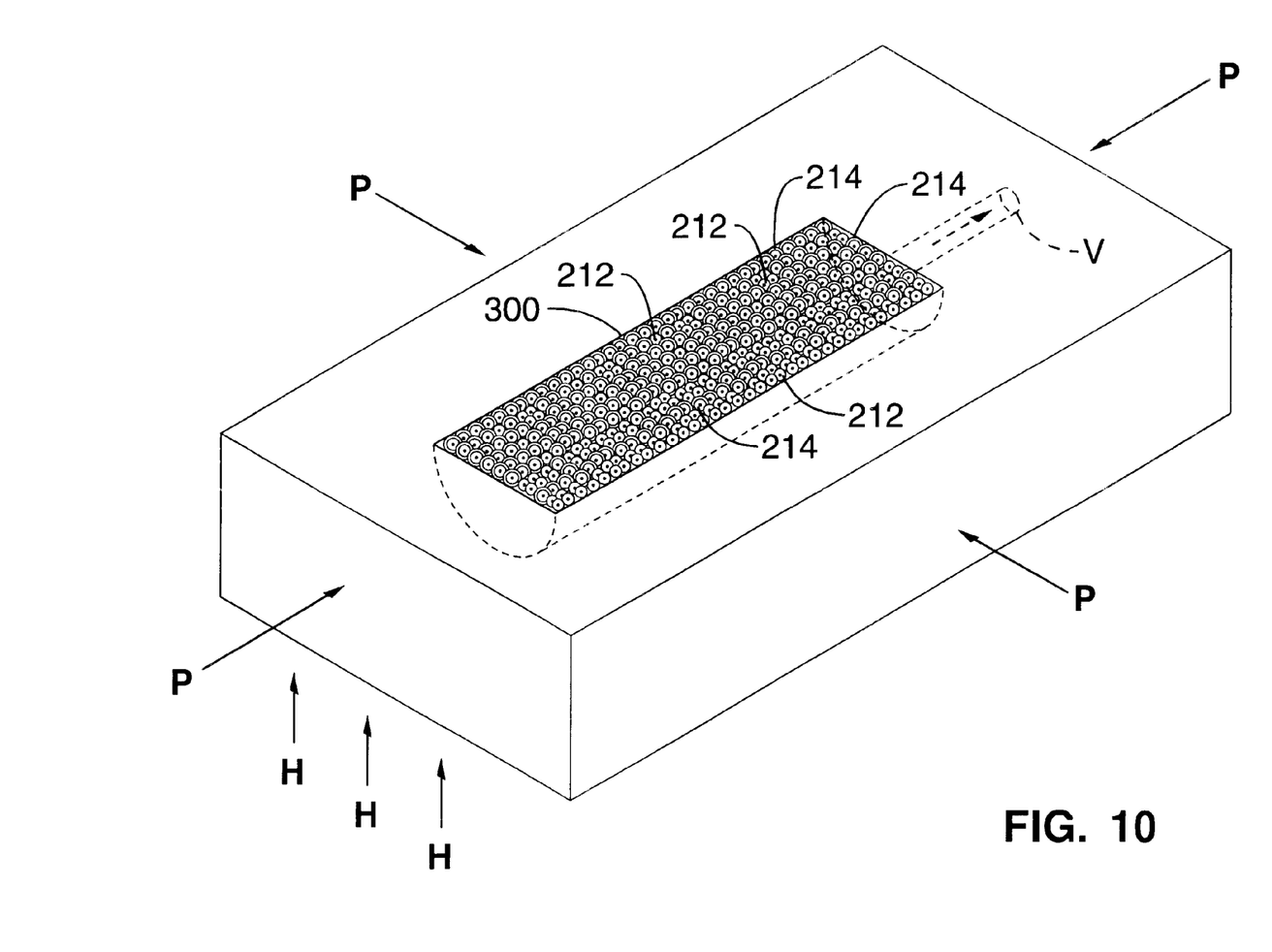
FIG. 10 is a cross-sectional view of the molding process, wherein the plurality of particles with at least one layer of at least one polymer coated powdered metal particles and cured is being molded (with optional concurrent heat, pressure, and/or vacuum), and thereby forming a polymer matrix-powdered metal composite material, in accordance with the present invention.

Referring now to FIG. 10, process step 120 is depicted in the cross-section of a cylindrical mold shown. Here, a plurality of cured single-coated 212 or double-coated 214 powdered metal particles are molded (with optional concurrent pressure P, heat H, and/or vacuum V), and thereby form the polymer matrix-powdered metal composite material 300. Multiple layered particles may be blended with single layered particles or the layered particles may be kept uniform.

Optionally, the polymer coated powdered metal particles may be molded in a core-shaped mold to form a polymer matrix-powdered metal composite core (not shown). This core may be configured in several shapes (e.g. cylinder, toroid, "E," "EF," "EM," "U," bus bar, bobbin, hollow, disk, or any combination thereof) using appropriate mold contours.

Figure 11:
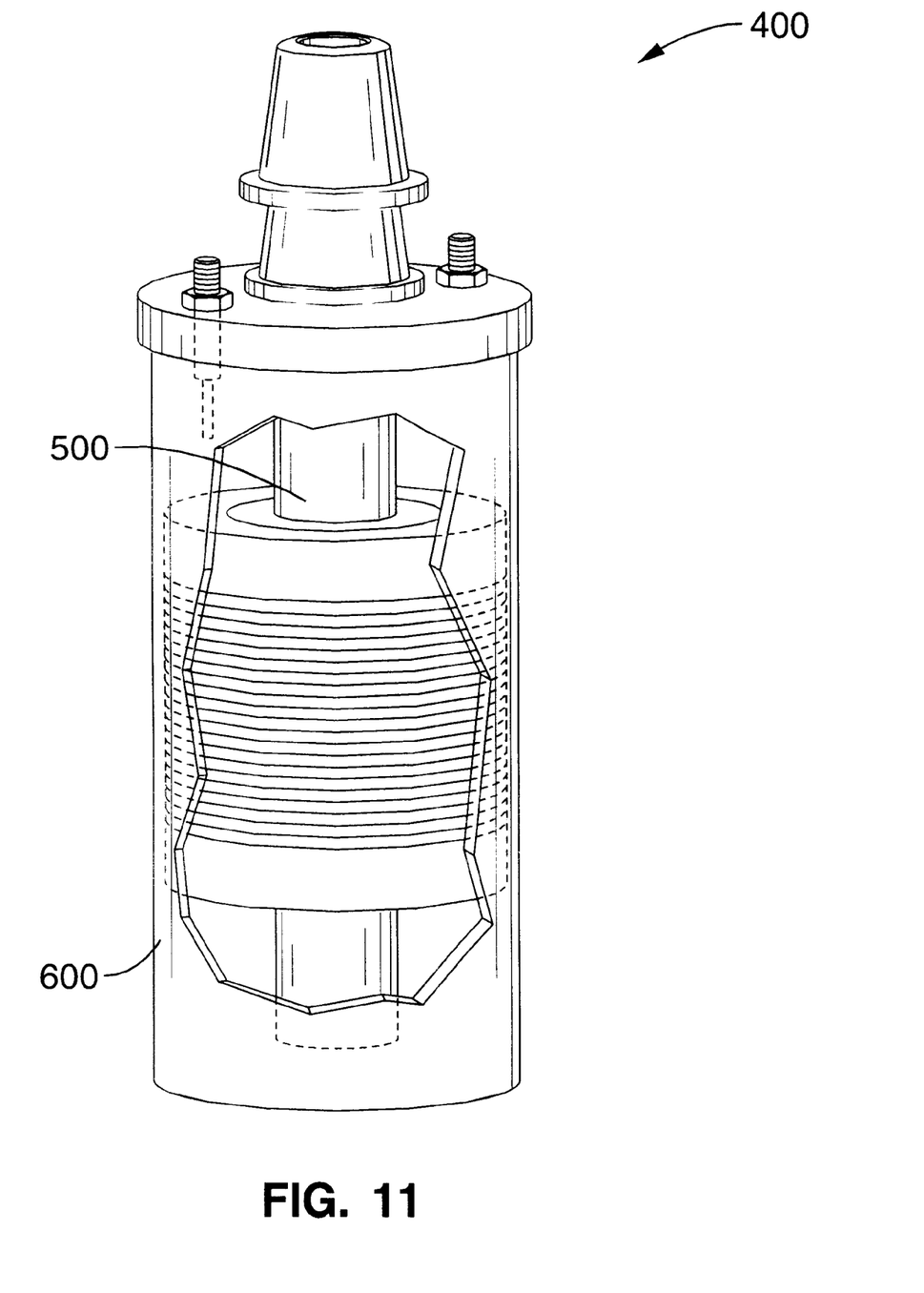
FIG. 11 is an illustration depicting the polymer matrix-powdered metal composite core as incorporated in an ignition coil, in accordance with the present invention.

Lastly, FIG. 11 illustrates an end product ignition coil 400 wherein a polymer matrix-powdered metal composite core 500 fabricated according to the process described above is housed in a coil case 600.

Although the description above contains much specificity, it should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of fabricating a polymer matrix-powdered metal composite material, comprising:
   (a) introducing a plurality of powdered metal particles into a cross linking or thermosetting polymer in a solution within a fluidized bed;
   (b) setting said plurality of powdered metal particles into constant motion;
   (c) coating said plurality of powdered metal particles with a layer of said polymer;
   (d) drying said plurality of polymer coated powdered metal particles;
   (e) pre-curing said polymer on said coated powdered metal particles;
   (f) removing said plurality of pre-cured polymer coated powdered metal particles from said fluidized bed; and
   (g) molding said plurality of pre-cured polymer coated powdered metal particles into a polymer matrix-powdered metal composite material.

2. A method as recited in claim 1, further comprising, prior to step g, repeating steps (a) through (f) with a second polymer.

3. A method as recited in claim 1, wherein said liquid polymer is selected from the group of materials consisting of polyimide resin and epoxy resin.

4. A method as recited in claim 1, wherein said plurality of powdered metal particles comprises at least one element selected from the group consisting of neodymium, iron, and boron.

5. A method as recited in claim 1, wherein said molding step further comprises at least one concurrent step selected from the group of techniques consisting of heating, pressurizing, and vacuuming, wherein said plurality of pre-cured polymer coated powdered metal particles is treated by said at least one concurrent step, and thereby forming said polymer matrix-powdered metal composite material.

6. A method as recited in claim 1, wherein said pre-cured polymer coated powdered metal particles are molded into a polymer matrix-powdered metal composite core for an automotive ignition coil.

7. A method of fabricating a polymer matrix-powdered metal composite material, comprising:
   (a) providing a fluidized bath, said fluidized bath having a fluidized bed), wherein said fluidized bed contains a liquid cross linking or thermosetting polymer;
   (b) introducing a plurality of powdered metal particles to said polymer within said fluidized bed;
   (c) setting said plurality of powdered metal particles in constant motion by said fluidized bed;
   (d) coating said plurality of powdered metal particles with a layer of said polymer;
   (e) removing said remainder of said polymer from said fluidized bed;

(f) drying said plurality of coated powdered metal particles in situ;

(g) pre-curing said coated polymer onto said plurality of powdered metal particles in situ by heating said fluidized bath, thereby heating said fluidized bed, and thereby forming a plurality of pre-cured polymer coated powdered metal particles;

(h) removing said plurality of pre-cured polymer coated powdered metal particles from said fluidized bed; and (i) molding said plurality of pre-cured polymer coated powdered metal particles, and thereby forming said polymer matrix-powdered metal composite material.

8. A method as recited in claim 7, further comprising the step of, prior to step (i), repeating steps (a) through (h) with a second polymer.

9. A method as recited in claim 7, wherein said polymer is selected from the group of materials consisting of polyimide resin and epoxy resin.

10. A method as recited in claim 7, wherein said plurality of powdered metal particles comprises at least one element selected from the group consisting of neodymium, iron, and boron.

11. A method as recited in claim 7, wherein said molding step further comprises at least one concurrent step selected from the group of techniques consisting of heating, pressurizing, and vacuuming, wherein said plurality of pre-cured polymer coated powdered metal particles is treated by said at least one concurrent step, and thereby forming said polymer matrix-powdered metal composite material.

12. A method as recited in claim 7, wherein said polymer coated powdered metal particles are molded into a polymer matrix-powdered metal composite core for an automotive ignition coil.

13. A method of fabricating a polymer matrix-powdered metal composite material, comprising:

(a) providing a fluidized bath, said fluidized bath having a fluidized bed, wherein said fluidized bed contains a cross linking or thermosetting polymer;

(b) introducing a plurality of powdered metal particles to said polymer within said fluidized bed;

(c) setting said plurality of powdered metal particles in constant motion by said fluidized bed;

(d) coating said plurality of powdered metal particles with a layer of said polymer;

(e) removing said remainder of said polymer from said fluidized bed;

(f) drying said plurality of coated powdered metal particles in situ;

(g) pre-curing said polymer onto said plurality of powdered metal particles in situ by heating said fluidized bath, thereby heating said fluidized bed, and thereby forming a plurality of pre-cured polymer coated powdered metal particles;

(h) removing said plurality of pre-cured polymer coated powdered metal particles from said fluidized bed;

(i) repeating steps (a) through (h) with a second polymer; and (j) molding said plurality of pre-cured polymer coated powdered metal particles, and thereby forming said polymer matrix-powdered metal composite material.

14. A method as recited in claim 13, wherein said polymer is selected from the group of materials consisting of polyimide resin and epoxy resin.

15. A method as recited in claim 13, wherein said plurality of powdered metal particles comprises at least one element selected from the group consisting of neodymium, iron, and boron.

16. A method as recited in claim 13, wherein said molding step further comprises at least one concurrent step selected from the group of techniques consisting of heating, pressurizing, and vacuuming, wherein said plurality of pre-cured polymer coated powdered metal particles is treated by said at least one concurrent step, and thereby forming said polymer matrix-powdered metal composite material.

17. A method as recited in claim 13, wherein said pre-cured polymer coated powdered metal particles are molded into a polymer matrix-powdered metal composite core for an automotive ignition coil.

* * * * *